United States Patent
Choi (10) Patent No.: US 7,896,941 B2
(45) Date of Patent: *Mar. 1, 2011

(54) PRODUCT AND METHOD OF FORMING A GRADIENT DENSITY FIBROUS FILTER

(75) Inventor: Kyung-Ju Choi, Louisville, KY (US)

(73) Assignee: AAF-McQuay Inc., Louisville, KY (US)

( * ) Notice: Subject to any disclaimer, the term of this patent is extended or adjusted under 35 U.S.C. 154(b) by 759 days.

This patent is subject to a terminal disclaimer.

(21) Appl. No.: 11/761,812

(22) Filed: Jun. 12, 2007

(65) Prior Publication Data

US 2007/0227359 A1 Oct. 4, 2007

Related U.S. Application Data

(60) Continuation-in-part of application No. 10/882,856, filed on Jul. 1, 2004, now Pat. No. 7,390,443, which is a division of application No. 09/781,786, filed on Feb. 12, 2001, now abandoned, application No. 11/761,812, which is a continuation-in-part of application No. 11/006,429, filed on Dec. 7, 2004, now Pat. No. 7,398,887, which is a division of application No. 09/781,786, filed on Feb. 12, 2001, now abandoned.

(51) Int. Cl.
*B01D 39/16* (2006.01)
(52) U.S. Cl. .............. 55/486; 55/487; 55/528; 55/DIG. 5; 55/DIG. 39; 55/DIG. 44
(58) Field of Classification Search ............ 55/486, 55/487, 512, 521, 524, 527, 528, DIG. 5, 55/DIG. 39, DIG. 44; 361/230, 231, 233; 95/57
See application file for complete search history.

(56) References Cited

U.S. PATENT DOCUMENTS

| | | | |
|---|---|---|---|
| 2,084,582 | A | 6/1937 | Goldman |
| 4,093,437 | A | 6/1978 | Ichihara et al. |
| 4,322,385 | A | 3/1982 | Goetz |
| 4,560,385 | A | 12/1985 | Bavavian |
| 4,589,983 | A | 5/1986 | Wydevan |
| 4,661,255 | A | 4/1987 | Aumann et al. |
| 4,731,135 | A | 3/1988 | Tani et al. |
| 4,732,675 | A | 3/1988 | Badolato et al. |
| 5,082,476 | A | 1/1992 | Kahlbaugh et al. |

(Continued)

OTHER PUBLICATIONS

Choi; Air Permeability and Pore Distribution of a Dual-Layered Microglass Filter Medium; AFS Society; 1994; pp. 97-99; vol. 8; US.

(Continued)

*Primary Examiner*—Duane Smith
*Assistant Examiner*—Minh-Chau Pham
(74) *Attorney, Agent, or Firm*—James E. Cole; John F. Salazar; Middleton Reutlinger (57) ABSTRACT

A filter media product and method of making the same wherein at least two filter media thicknesses of differing average coarse and fine fiber sizes are held in intertangled relationship forming a gradient density fibrous filter media with the fiber sizes having an overall average in successive thicknesses being either greater or less than the average fiber size of the intertangled fiber thickness(es).

20 Claims, 4 Drawing Sheets

U.S. PATENT DOCUMENTS

| | | | |
|---|---|---|---|
| 5,275,743 A | | 1/1994 | Miller et al. |
| 5,425,672 A | | 6/1995 | Rotter |
| 5,480,464 A | | 1/1996 | De Villiers et al. |
| 5,800,586 A | | 9/1998 | Cusick et al. |
| 5,805,452 A | | 9/1998 | Anthony et al. |
| 5,858,045 A | | 1/1999 | Stemmer et al. |
| 5,885,390 A | | 3/1999 | Alkire et al. |
| 5,952,092 A | | 9/1999 | Groeger et al. |
| 5,968,373 A | | 10/1999 | Choi |
| 5,972,808 A | | 10/1999 | Groeger et al. |
| 6,024,813 A | | 2/2000 | Groeger et al. |
| H001909 H | | 11/2000 | Ahr |
| 6,387,141 B1 * | 5/2002 | Hollingsworth et al. ....... 55/486 |
| 6,585,794 B2 * | 7/2003 | Shimoda et al. ............... 55/527 |
| 6,926,828 B2 * | 8/2005 | Shiraishi et al. ............ 210/310 |
| 7,390,443 B1 * | 6/2008 | Choi ............................ 264/6 |
| 7,398,887 B2 * | 7/2008 | Choi ........................ 210/491 |
| 2002/0139744 A1 * | 10/2002 | Choi ........................ 210/491 |

OTHER PUBLICATIONS

Choi; Pore Distributions and Permeability of Cellulosic Filtration Media; Fluid/Particle Separation Journal; Mar. 1994; pp. 1-3; vol. 7; US.

Choi; Fluid Flow Through Filter Media at a Given Differential Pressure Across Media; Fluid/Particle Separation Journal; Jun. 1996; pp. 136-146; vol. 9; US.

Annual Book of ASTM Standards; Pore Size Characteristics of Membrane Filters by Bubble Point and Mean Flow Pore Test; pp. 330-333; US.

Choi; Permeability Pore Size Relationship of Nonwoven Filter Media; Nonwovens Conference; 1995; pp. 49-50; US.

Choi; Prediction of Air Permeability and Pore Distribution of Multi-Layered Nonwovens; INJ; pp. 62-63; vol. 6; US.

* cited by examiner

PRODUCT AND METHOD OF FORMING A GRADIENT DENSITY FIBROUS FILTER

CROSS-REFERENCE TO RELATED APPLICATIONS

This patent application claims priority from and is a continuation-in-part of U.S. patent application Ser. No. 10/882,856, filed Jul. 1, 2004, now U.S. Pat. No. 7,390,443 B1, issued on Jun. 24, 2008, hereby incorporated herein by reference, which claims priority as a divisional patent application from U.S. patent application Ser. No. 09/781,786, filed on Feb. 12, 2001, abandoned. This current patent application also claims priority from and is a continuation-in-part patent application of U.S. patent application Ser. No. 11/006,429, filed Dec. 7, 2004, now U.S. Pat. No. 7,398,887 B2, issued on Jul. 15, 2008, hereby incorporated herein by reference, which claims priority as a divisional patent application from U.S. patent application Ser. No. 09/781,786, filed on Feb. 12, 2001, abandoned.

SPONSORED RESEARCH OR DEVELOPMENT

Not applicable.

FIELD OF INVENTION

The present invention relates to filters, such as gas or air filters, and methods of forming filters.

BACKGROUND OF THE INVENTION

The present invention relates to filter media and more particularly to a unique and novel arrangement for further improving the efficiency of particulate removal and extending the life of the filter resulting in improved filter media performance.

Generally, filter design has balanced a trade off between high filter efficiency and extended life of the filter. Extended life is typically defined according to a limiting pressure drop across the filter or across a thickness in the filter media. The filter will typically be considered to have reached its dust holding capacity when the pressure gradient across the filter has reached this limit.

Efficiency is the propensity of the filter media to capture particulates of any size of particulate matter. Therefore, the more efficient a filter media is at removing particulates from a gas flow stream the more rapidly the filter media will load and approach the holding capacity of the filter. Hence, improving life of filter and efficiency in a filtration media without substantially increasing the pressure drop across the filtration media remains a challenge in improving filtration performance. The term performance as used herein incorporates extended life, efficiency, and pressure drop across the filter wherein performance increases with an increase in efficiency and life of filter.

Varying density depth media arrangements have been developed in an attempt to increase filter media performance. Some such arrangements are described, for example, in U.S. Pat. Nos. 4,082,476; 5,238,474; and 5,364,456. In general, a depth media arrangement can be designed to provide "loading" of particulate materials more uniformly throughout its volume or depth. However, in general, many of these prior designs fail to provide uniform loading and a desired efficiency.

It is also known that filtration efficiency of fibrous filter media can be improved by a significant amount when fibers in a fibrous media are electrically charged, making the fibrous media an "electret". In 1980, Kubik et al. (U.S. Pat. No. 4,215,682) describes a method for introducing an electric charge into meltblown microfibers during fiber formation.

It has been recognized that there is a critical need in the fluid filtration art to provide filtration media with extended life and with finer particle filtration capabilities without a substantial increase in pressure drop across the filtration media.

SUMMARY OF THE INVENTION

In accordance with the present invention, a gradient density fibrous media is provided having a multi layered mat of intertangled fibers with little or no boundary between the layers forming substantially a single layer of gradient fiber size with a larger average fiber size at the less dense side of the filter media and a smaller average fiber size at the more dense side of the filter media. Also provided herein is a method of forming the gradient density fibrous filter media. Optionally, the gradient density fibrous media may be electret and/or self supporting.

More particularly, the present invention provides a multi-thickness filter media comprising a combination of at least two successive adjacent intertangled thicknesses of chopped fibers wherein each thickness has substantially different combined denier fibers than other thicknesses. The average pore size characteristics of one thickness differs from that of an adjacent thickness with the different combination of fiber sizes of one thickness being comparatively finer, on the average, than the fibers of the other thickness forming different combinations of fiber and pore sizes of the successive intertangled thicknesses in order to improve filtration performance. In a preferred embodiment, the intertangled thicknesses form substantially a single thickness having an overall gradient density and stiffness sufficient to be self supporting. Further, the present invention provides a unified method of manufacturing such filter media comprising: collecting a first thickness of chopped fibers in a hopper-collector zone, the first thickness of chopped fibers being of a first combination of fibers and pore sizes; collecting at least a second thickness of chopped fibers in a hopper collector zone to be successively joined in overlying intertangled relation with the first thickness of chopped fibers, the second thickness of chopped fibers being of a second combination of fibers and pore sizes different from the fibers and pore sizes of the first thickness of chopped fibers with the combination of fibers of one thickness being finer than that of fibers of the other thickness; passing the first and second thicknesses to a carding zone, individually or together, to open and align the chopped fibers in each thickness, calendaring at least one side of the combined thicknesses, the successively joined filter thicknesses having an intertangled relationship to improve particulate filtration efficiency and extended life of filter with the overall average pore size and permeability of the combined successive intertangled thicknesses being substantially a single layer of filter media having a gradient density.

Optionally, the present invention recognizes that it may be advantageous to utilize a design equation for calculating filtration characteristics. Given filtration characteristics such as mean flow pore size, pore size distribution, permeability, mean fiber size, porosity defined as pore volume over total volume and dust loading characteristics of individual thickness, filtration characteristics of combined media thicknesses can be calculated by utilizing the formula set forth in U.S. Patent Publication 2005/0139543, published by Kyung-Ju Choi on Jun. 30, 2005.

Another option that may be employed to increase filtration performance is to make a portion of filter media electret. By providing an electrostatic charge to the filter medium, particulate contaminants can be trapped electrically as well as mechanically. For example, a temporary or permanent electrical charge can be imparted to a polyolefin such as polyethylene or polypropylene containing fiber. An electrostatic charge can be provided while conveying multi layer media, thus making the fibrous media an electret. When using chopped fibers which may be bicomponent or single component fibers having a portion containing a polyolefin, polycarbonate, polyhalogenated carbon, or other charge retaining material, corona charging is the preferred method. Polyolefin fibers are especially useful, while other polymers may also be used having appropriate environmental conditions.

It is to be understood that various changes can be made by one skilled in the art in one or more of the several parts and in one or more of the several steps in the apparatus and method disclosed herein without departing from the scope or spirit of the present invention. For example, filter media thicknesses of different materials and different pore sizes compatible with the principles taught herein can be utilized without departing from the scope or spirit of the present invention.

BRIEF DESCRIPTION OF THE DRAWINGS

With reference to the figures, they disclose several embodiments of the present invention and are not to be interpreted as limiting the scope of the present invention.

FIG. 1A-1 is a side elevational view of a schematic flow diagram of equipment arranged to carry out steps to produce a gradient density fibrous filter wherein layers are carded separately;

FIG. 1B-1 is a side elevational view of a schematic flow diagram of equipment arranged to carry out steps to produce a gradient density fibrous filter wherein layers are carded together;

FIGS. 1A-2 and 1B-2 show side elevational views of a schematic flow diagrams of equipment arranged to form pleats and cut pleat the fibrous filters formed in the processes shown in FIGS. 1A-1 and 1B-1 respectively;

DETAILED DESCRIPTION OF THE PREFERRED EMBODIMENTS

Referring specifically to FIGS. 1A-1, 1B-1, 1A-2, and 1B-2 of the figures, schematic flow diagrams 2 and 2' are disclosed, these diagrams each schematically include several sections arranged successively and substantially in-line to produce gradient density filter media 222 and 222' such as disclosed in FIGS. 1A-2 and 1B-2 respectively of the figures. The disclosed flow-diagrams in FIGS. 1A-1 and 1B-1, each broadly include four process sections—namely, the bracketed mixer-blender sections 4 and 4', the bracketed carding sections 6 and 6', the bracketed heating sections 7 and 7' and the bracketed calendering sections 8 and 8'. Mixer-blender section 4, as shown FIG. 1A-1, discloses three spaced mixer-blenders 9, 11 and 12. These mixer -blenders 9, 11 and 12 can be arranged with the outlets at different spaced levels to feed blended chopped fibers of size ranges to endless collector belts 13, 14, and 16, respectively, spaced at different levels to cooperate respectfully with the outlets of mixer-blenders 9, 11 and 12. Spaced belts 17, 18 and 19 of thicknesses of blended chopped fibers are formed respectively on endless collector belts 13, 14 and 16 and are passed to the carding section 6. In a manner generally known in the art and not shown herein, chopped fibers measuring up to approximately one(1) to three(3) inches in length of coarse to fine deniers, as determined in accordance with the present invention described hereinafter are passed to mixer-blenders 9, 11, and 12, respectively, from hopper feeders, beater openers, conveyors, fine openers, vibra feeders, or other feeders as known in the art. In accordance with the present invention and based on environmental conditions the fibers fed to mixer-blenders 9, 11 and 12 can be of several combinations of coarse fibers, intermediate fibers and fine fiber thicknesses, a portion of which may advantageously have single component fibers, bicomponent fibers, antimicrobial, and fibrillated fibers. For example, when two thicknesses of media are involved, combinations of either coarse fibers and intermediate fibers or fine fibers, or even intermediate and fine fibers can be employed. When three thicknesses of media are involved combinations of coarse fibers, intermediate fibers, and fine fibers can be employed.

A "coarse layer" thickness of depth with fibers is composed of fiber blend having an average fiber size larger than that of the intermediate layer considered to have a portion having fibers larger than or equal to largest single component fiber size of the intermediate layer and a portion of which are bicomponent fibers. Advantageously this coarse layer has 6 denier and/or larger than 6 denier single component fibers.

An "intermediate layer" thickness of depth with fibers is composed of fiber blend having an average fiber size larger than that of the fine layer considered to have a portion having fibers larger than or equal to largest single component fiber size of the fine layer and a portion of which are bicomponent fibers. Advantageously this intermediate layer has 6 denier and/or smaller than 6 denier single component fibers.

A "fine layer" thickness of depth with fibers is composed of fiber blend having an average fiber size considered to have a portion having advantageously 4 denier or less than 4 denier single component fibers and a portion of which are bicomponent fibers.

These individual layers have bicomponent fibers in a range of 20% to 100% with the remainder being single component fibers and compressed to form multi layer melt or fuse bonded pleatable gradient density media. In one embodiment, a pleatable multi layer gas filter media has a first layer composed of a first fiber blend having a first average fiber size and an amount of first single component fibers and a second layer composed of a second fiber blend having a second average fiber size and an amount of second single component fibers. The first average fiber size is greater than the second average fiber size and the first fiber blend has a portion of fibers larger than or equal to a largest single component fiber size of the amount of second single component fibers while the second fiber blend has a portion less than or equal to a smallest single component fiber size of the amount of first single component fibers.

In the case of more than three layers, it is assumed to repeat the intermediate layer with an appropriate fiber sizes by reducing the fiber sizes of the fine final layer down to 3 or 2.2 or 2 or 1.5 or 1.2 or 0.9 or less than 0.9 denier.

Figure 1A:
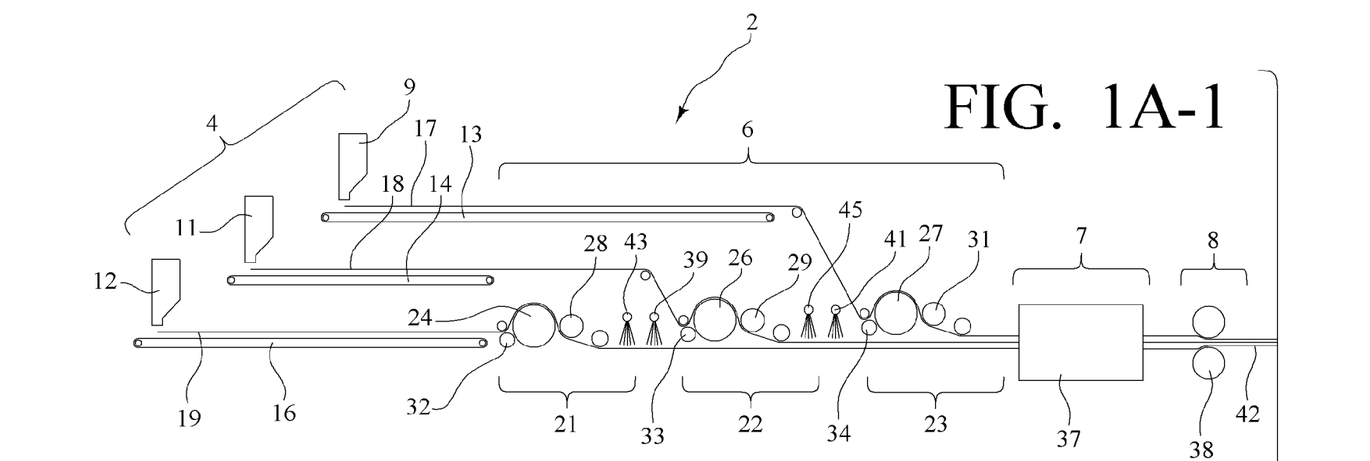

Preferably, the fiber combinations and process steps taken to produce the gradient density fiberous filter are such that a self supporting filter media having a Gurley stiffness of at least 500 mg. is provided. A permeability of multilayer media is in a range of 100 to 700 cubic feet per minute over square feet (cfm/sq. ft.). The bicomponent fibers have high melting portion and low melting portion. Advantageously, high melting portion is a polyester and low melting portion is a polypropylene or co-polyester, or a polyethylene. In an embodiment wherein a portion of the gradient density fibrous filter is electret, a portion of the fibers have a polyolefin such as polyethylene and polypropylene or other charge retaining material. Advantageously, mixer-blenders 9, 11 and 12 have coarse, intermediate, and fine fibers respectively. Such an arrangement provides thicknesses of fibers with, on the average, larger fibers nearer the top of the filter media. Such an arrangement provides a starting gradient of fiber sizes that is enhanced through the process steps where finer fibers can possibly migrate slightly down to provide a substantially single layer of intertangled filter media with a substantially gradient density. In the carding section 6 of FIG. 1A-1, three spaced carding roll assemblies 21, 22 and 23 are shown. Each assembly includes a spaced main carding roll 24, 26, and 27, respectively, with each having a cooperating smaller randomize roll 28, 29 and 31, respectively. Suitable guide roll sets 32, 33 and 34, respectively, are provided with each carding roll assembly 21, 22 and 23 respectively to insure that the spaced carded fibrous filter media layers are properly passed in spaced alignment to heating section 7 and through the spaced open ended heating oven 37 and spaced calendering section 8 which includes the cooperating spaced upper and lower calendering rolls 38. Optionally, upper and lower calendering roll 38 is heated or chilled providing for the calendering of more than one side of the mixed fibers. This serves to melt a portion of the fibers on the clean air side of the filter media providing for the retention of a higher percentage of smaller particles that may be filtered therethrough. It is to be noted that between spaced carding roll assemblies 21 and 22 and between spaced carding roll assemblies 22 and 23, suitable spray mechanisms 39 and 41 may optionally be provided to spray an appropriate binder such as an acrylic binder (either hydrophilic or hydrophobic) or hot melt unto the upper surface of the carded mat therebelow or to both sides so as to bond the thicknesses of calendered, chopped fiber mats together. Such an option is advantageous if no or a low percentage of fibers are low melt or bicomponent fibers. Optionally, either or both dispensers 43 and 45 may dispense an odor neutralizer or adsorbents such as zeolite, alumina, activated silica, $CaCO_3$, activated carbon, or other reactants, adsorbents, or absorbents and combinations thereof to remove typical indoor volatile organic compounds. After calendering section 8 is optional corona charged in charger 10 which may be incorporated into the process making layered fibrous mat 42 electret.

Alternatively, and as disclosed in FIG. 1B-1, the thicknesses of fibers can be intertangled and formed on a single endless belt 15 passing successively under mixer-blenders 9', 11' and 12'. Mixer-blender section 4', as shown FIG. 1B-1, discloses three spaced mixer-blenders 9', 11' and 12'. These mixer-blenders 9', 11' and 12' can be arranged with the outlets at similarly spaced levels to feed layers of blended chopped fibers of size ranges to endless collector belt 15. The layers are then passed to the carding section 6' where they are calendered together. In accordance with the present invention and based on environmental conditions, the fibers fed to mixer-blenders 9', 11' and 12' can be of several combinations of coarse fibers, intermediate fibers and fine fiber thicknesses respectively. In the carding section 6', a spaced carding roll assembly 21' is shown. Carding roll assembly 21' includes a spaced main carding roll 24' cooperating with randomize roll 28'. Suitable guide roll set 32' is provided to insure that the spaced carded fibrous filter media layers are properly passed in spaced alignment to heating section 7' and through the spaced open ended heating oven 37' and spaced calendering section 8' which includes the cooperating spaced upper and lower calendering rolls 38'. Alternatively, upper and lower calendering rolls 38' are heated or chilled. After calendering section 8' is optional corona charged in corona charger 10' which may be incorporated into the process making layered fibrous mat 42' electret.

Figure 1A:
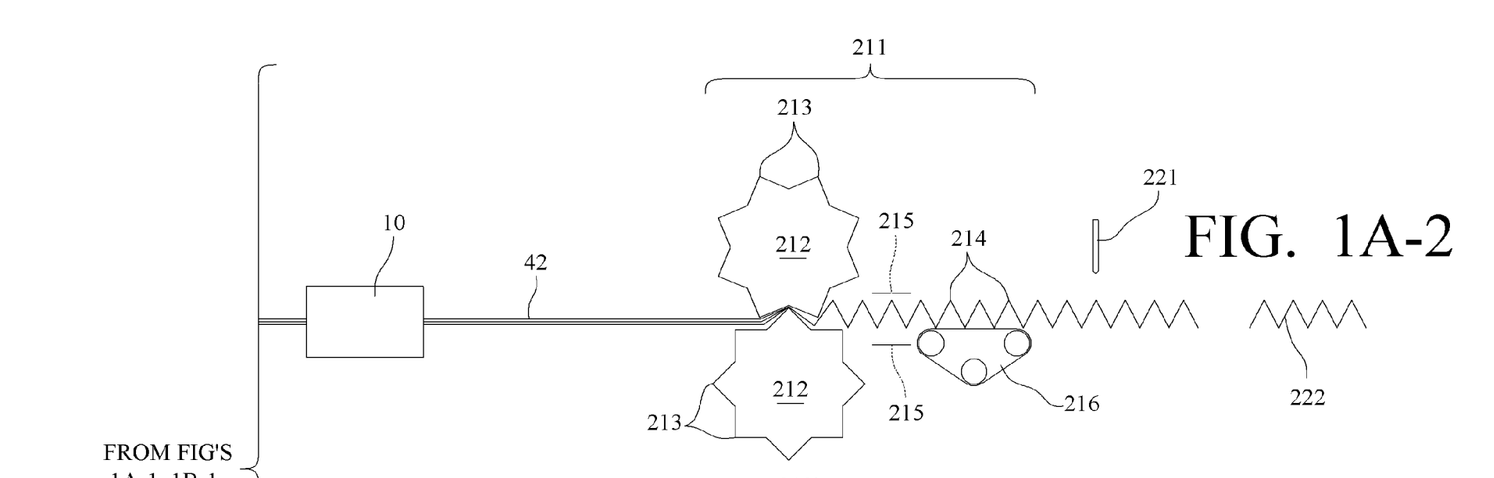
Figure 1B:
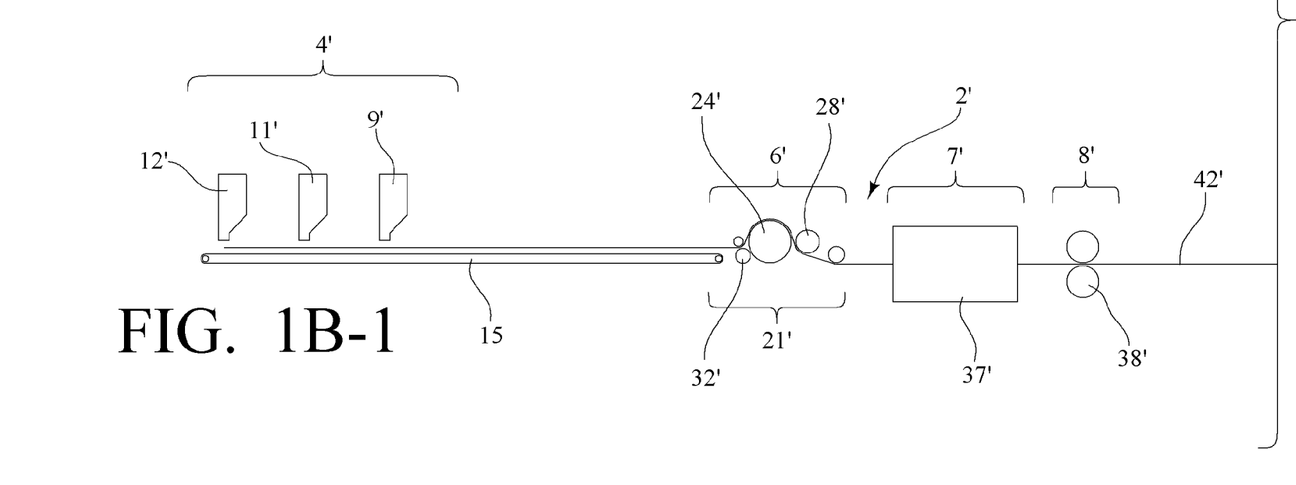
Figure 1B:
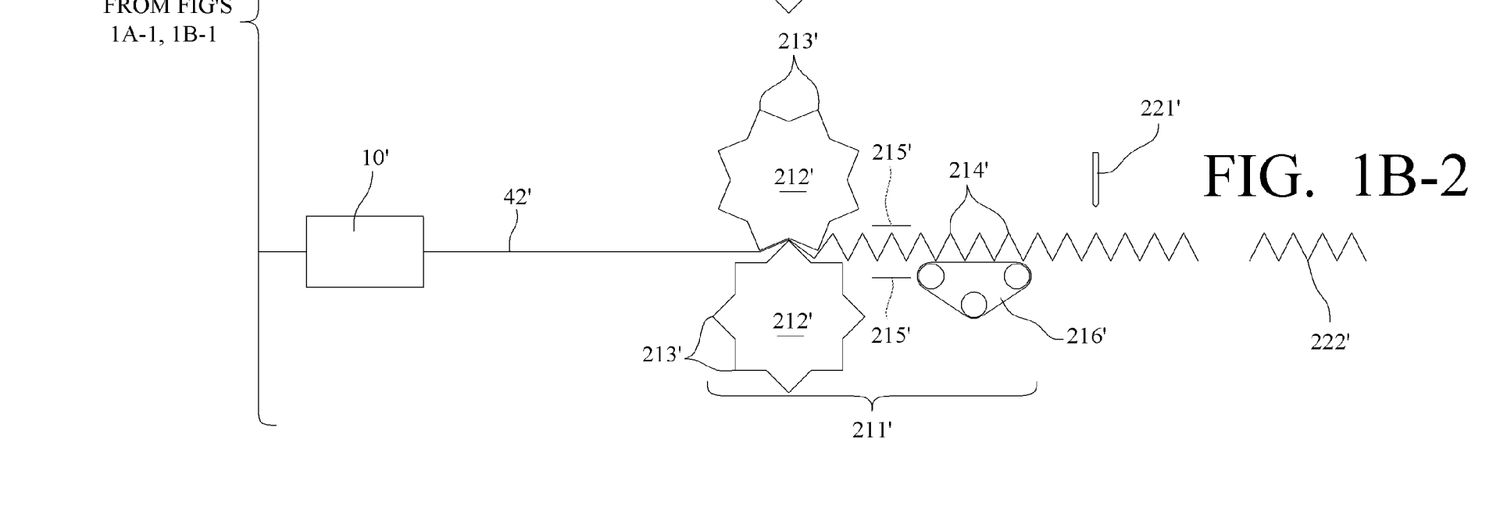

Filter medium 42 and 42' can be fed as a continuous filter medium sheets 42 and 42' from calendering stations 8 and 8' respectively at a velocity to a pleat forming zone 211 and 211' respectively where opposed and aligned forming rollers or gear wheels 212 and 212' with spaced opposed triangular pleat forming ridges 213 and 213' forming pleat crests 214 and 214' thereon. Heating can be accomplished by heating upper and lower gears 212 and 212', with heat plates 215 and 215', or both. Optionally, filter medium 42 and 42' can be pleated by other methods as is known in the art such as scoring or with a knife. Filter medium sheets 42 and 42' can then be fed at a lower velocity by conveyor 216 and 216' to a pleat shearing zones 221 and 221' respectively. Pleat shearing zones 221 and 221' sever pleated filter medium 42 and 42' respectively into self-supporting pleated filter medium units 222 and 222', each unit having a number of pleats in accordance with its destined use.

Figure 2:
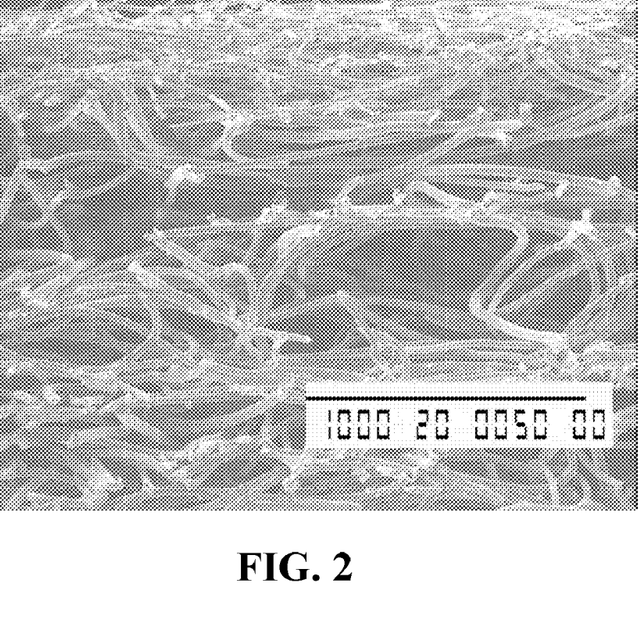
FIG. 2 shows a cross-sectional view of a gradient density fibrous media.
Figure 3:
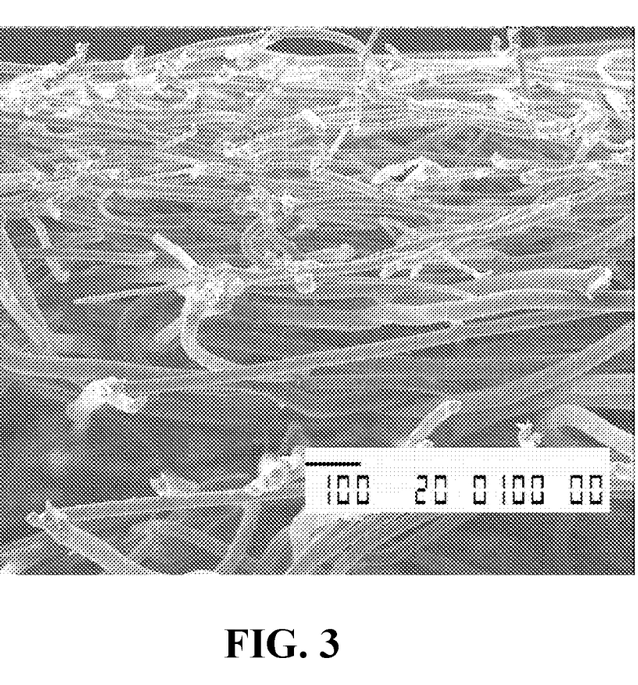
FIG. 3 shows a cross-sectional view of an alternative embodiment of the gradient density fibrous media.

FIGS. 2 and 3 show cross-sectional views of two alternative embodiments of the gradient density fiber media. FIG. 2 shows the gradient density fiber media having a relatively thin layer of fine fibers on an upper portion being intertangled with a lower portion of relatively coarse fibers. FIG. 3 shows the gradient density fiber media having a relatively thick layer of fine fibers on an upper portion being intertangled with a lower portion of relatively coarse fibers. Both embodiments, shown in FIGS. 2 and 3, have a gradient density of fibers wherein the upper fine layer is intertangled with the lower coarse layer forming substantially a single layer of fibers having an overall gradient density.

Figure 4:
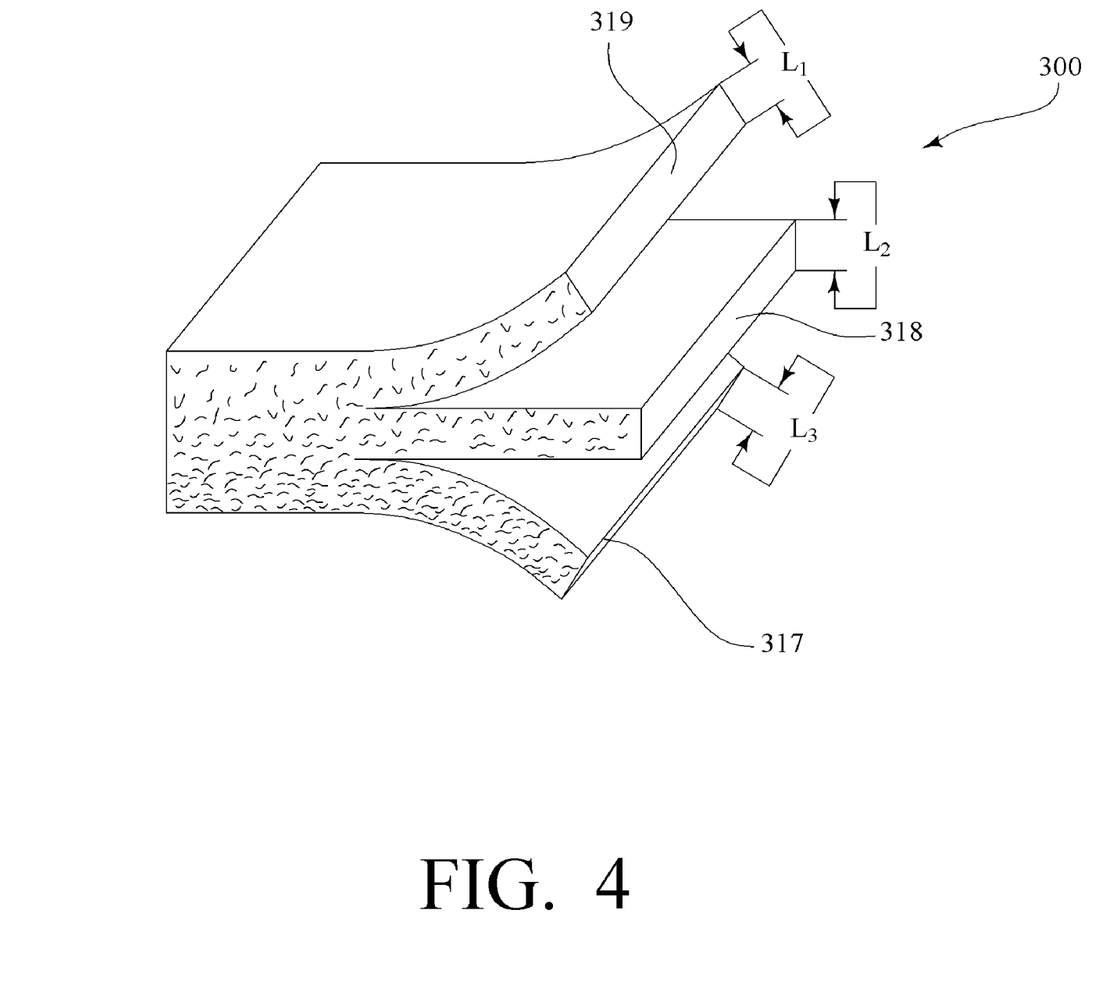
FIG. 4 shows thickness of 3 layers of filter media intertangled to form a gradient density fibrous media.

FIG. 4 shows thickness of 3 layers of filter media, 317, 318 and 319, being intertangled to form a gradient density fibrous media 300. Fiber layers 317, 318 and 319 are of fine, intermediate, and course fibers respectively. These layers are shown individually and as a part of gradient density fibrous media 300 wherein they form substantially a single gradient density layer.

In accordance with the present invention, it may be advantageous to maintain an equal share of the terminal differential pressure on an individual layer of medium. In such an embodiment, the following design criteria may be employed.

From Hagen-Poiseuille Law, Q may be given as:

$$Q = \frac{\pi P r^4}{8\mu L} = \frac{\Delta P(\pi r^2)^2}{\pi 8 \mu L} = \frac{\Delta P M^2}{\pi 8 \mu L} \quad 1$$

Hence $$\text{Constant} = \frac{\Delta P_i M_i^2}{L_i} \quad 2$$

where i=1, 2 and 3 for triple layer media and $\mu$ is the viscosity of fluid.

By solving Equation 2 for the double layer media:

$$\left(\frac{M_1}{M_2}\right)^2 = \frac{L_1}{L_2} \qquad 3$$

For the triple layer medium:

$$\left(\frac{M_2}{M_1 M_3}\right)^2 = \frac{L_2}{L_1 L_3} \qquad 4$$

The above equations as indicated by numerals 3 and 4 can be used to design the multi-layer calendered, chopped fiber filter media at the initial stage of filtration. However, the pore distribution and the mean flow pore of each thickness layer and/or thicknesses changes with time and captured particles in each layer or thickness. The incoming particle distribution changes as particles pass through prior layers. Equations 3 and 4 have to be applied at the final stage of filtration or right before the terminal differential pressure. It is to be understood that each layer can be designed experimentally by installing pressure sensors between each layer so that $\Delta P = \Delta P_1 = \Delta P_2 = \Delta P_3 = \Delta P_4 \ldots$ at the termination pressure.

For a multi-layered, chopped fiber mats, the average pore size of such multi-layered media may be much smaller than that of the finest layer. However, it may be slightly larger than predicted size because of a tortuous path ($1/\epsilon$), and the remaining parts of pores that are not used in predicted pore ($1/\epsilon$). The porosity, $\epsilon$, is the ratio of the pore volume to the total volume of media.

Hence, the average pore size of an n-layered media may be expressed as $$\frac{1}{M} = \varepsilon_i \varepsilon_{i+1} \ldots \varepsilon_n \left(\sum_{i=1}^{n} \frac{1}{M_i}\right) \qquad 5$$

where "i" is the order of the layer and "n" is the number of layers.

Likewise, the air frazier permeability of an "n"-layer medium, "v" in cfm/sq ft. may be expressed as:

$$\frac{1}{v} = \varepsilon_i \varepsilon_{i+1} \ldots \varepsilon_n \left(\sum_{i=1}^{n} \frac{1}{v_i}\right) \qquad 6$$

In a typical experiment in accordance with the present invention two polymeric air filter media were used. One was a fine layer and the other was a coarse layer. A porometer was used to measure the mean flow pore diameter and percent distribution of the number of pores.

In calculations in accordance with the present invention, $M_1$, $M_2$ and $M_3$ represent the total open area of the top, middle and bottom of three successively spaced selected thickness layers of filter media as shown in FIG. 4. $M_1$, $M_2$ and $M_3$, represent the mean flow pore size because the mean flow pore size is the average pore size. Letting $L_1$, $L_2$ and $L_3$ represent the thickness of the top, middle, and bottom layer and $\Delta P_1$, $\Delta P_2$ and $\Delta P_3$ represent the differential pressure drop across the top, middle, and bottom layer, respectively, the total pressure drop of triple layer medium would be $\Delta P = \Delta P_1 + \Delta P_2 + \Delta P_3$. The volumetric flow rate, Q was assumed to be a constant at any layer of medium.

The concept of the inventive multi-layer media is that the top thickness layer serves to catch big particles and the bottom thickness layer to hold small particles. To achieve the maximum capacity it may be necessary to maintain an equal share of the terminal differential pressure on an individual layer of medium.

In accordance with the novel invention this calculation can be made by the formulas:

$$\frac{1}{M} = \varepsilon_i \varepsilon_{i+1} \ldots \varepsilon_n \left(\sum_{i=1}^{n} \frac{1}{M_i}\right)$$

wherein the porosity "$\epsilon$" is the ratio of the pore volume to the total volume of media "$\Sigma$" is the summation from "i"=1 to n, and "M" is the mean flow pore diameter of the filter media layers and with the air frazier permeability of said three layered media being expressed by the formula:

$$\frac{1}{v} = \varepsilon_i \varepsilon_{i+1} \ldots \varepsilon_n \left(\sum_{i=1}^{n} \frac{1}{v_i}\right)$$

wherein "v" is air frazier, fluid velocity, in cfm/square foot, the porosity, "$\epsilon$" is the ratio of the pore volume to the total volume of media; and, "$\Sigma$" is the summation from i=1 to n.

For example, in the use of the air frazier permeability equation in the average pore size equation for designing a multi-layer filter, such as a filter with three layers, the first and coarse or upstream layer is a commercially available product having the following properties: the mean flow pore diameter, $M_1$, is 76.9 micrometers and the porosity is 0.97. A second commercially available product which is an intermedia layer has a mean flow pore diameter, $M_2$ of 52.8 micrometers and a porosity, $\epsilon_2$ of 0.95. Thus, if we desire a final medium which is the combination of three layers, to have a mean flow pore diameter, M of 21.4 micrometers, then for the third or downstream layer, we assume, for example, a porosity, $\epsilon_3$, of 0.94 and calculate the main flow pore diameter of $M_3$. In this case $M_3$ would be calculated from the average pore size formula to be 45.5 micrometers. Therefore, the third layer would have a porosity, $\epsilon_3$, of 0.94 and a mean flow pore diameter, $M_3$, of 45.4 micrometers. Thus, from the aforementioned calculations the design for a maximum efficiency for a three layer filter can be obtained.

Referring to FIGS. 1A-1 and 1B-1 of the drawings, the method of manufacturing gradient filter media 42 and 42', the said carded fibers in the bonded layers 19, 18 and 17 and 19', 18' and 17' being calculated so that the overall average pore size of the combined intertangled successive layers is smaller than the pore size of the independent finest fiber filter media layer 19 or 19' calculated by formulas above expressed including the air frazier permeability of the three layered medium being as expressed by the formula:

$$\frac{1}{v} = \varepsilon_i \varepsilon_{i+1} \ldots \varepsilon_n \left(\sum_{i=1}^{n} \frac{1}{v_i}\right)$$

wherein "v" is air frazier, fluid velocity, in cfm/square foot, the porosity, "$\epsilon$" is the ratio of the pore volume to the total volume of medium; and, "$\Sigma$" is the summation from "i"=1 to n.

The gradient density fibrous filter median may also include an electrostatic charge (e.g., an electret filter medium). By providing an electrostatic charge to the fibrous filter medium, particulate contaminants can be trapped electrically as well as mechanically. For example, an electrical charge can be imparted to a portion of the fibrous filter with corona charger 10 or 10', shown in FIGS. 1A-2 and 1B-2 respectively. Any charge retaining material such as polyolefins (i.e. polypropylene, polybutylene, and poly(4-methyl-1-pentene)), polycarbonates, polyhalogenated carbons, polyethylene, copolyester, copolyamide, polyurethanes, block copolymers such as styrene-butadiene-styrene and styrene-isoprene-styrene block copolymers, and combinations thereof, are incorporated into the media to be made electret. Bicomponent fibers such as polypropylene/polyethylene, polypropylene/polyester, and polypropylene/polyethylene-terephthalate bicomponent fibers and blends thereof may be used to make the gradient density fibrous filter media electret. These or other charge retaining materials can be incorporated into the fibrous media and exposed to a corona charger, 10 or 10', making filter material 222 or 222' electret.

It is to be understood that various alterations can be made in the flow diagram(s) of FIGS. 1A-1, 1A-2, 1B-1 and 1B-2 and the several sections thereof, as well as different sections added thereto by one skilled in the art without departing from the scope or spirit of the invention. For example, the chemical composition of the chopped fibers utilized can be varied, as can the number of thicknesses of carded fibrous media thicknesses employed and the application of optional chemical agents, bonding sprays, and charging. Further, the pore and fiber sizes and length of chopped fibers can be varied in designing the multi-thicknessed gradient density filtration media to optimize filtration performance.

The invention claimed is:

1. A pleatable multi layer gas filter media having at least dual layer gradient density comprising:
   a first layer composed of a first fiber blend having a first average fiber size and an amount of first single component fibers,
   a second layer composed of a second fiber blend having a second average fiber size and an amount of second single component fibers,
   said first average fiber size being greater than said second average fiber size,
   said first fiber blend having a portion larger than or equal to a largest single component fiber size of said amount of second single component fibers,
   said second fiber blend having a portion less than or equal to a smallest single component fiber size of said amount of first single component fibers; and,
   said first and second layers being compressed multi layer partially melted or fuse bonded;
   wherein each of said layers are individually carded to create said gradient density.

2. The gas filter media of claim 1 wherein said first fiber blend has bicomponent fibers in a range of 20% to 100% with the remainder being said amount of first single component fibers.

3. The gas filter media of claim 1 wherein said second fiber blend has bicomponent fibers in a range of 20% to 100% with the remainder being said amount of second single component fibers.

4. The gas filter media of claim 1 wherein said amount of first single component fibers has 6 denier and/or larger than 6 denier single component fibers.

5. The gas filter media of claim 1 wherein said amount of second single component fibers has 6 denier and/or smaller than 6 denier single component fibers.

6. The gas filter media of claim 1 wherein said first layer and second layer have an odor neutralizer or an adsorbent material therebetween providing for the removal of odor or volatile organic compounds.

7. The gas filter media of claim 1 wherein said layers of fiber blends are corona charged.

8. The gas filter media of claim 1 wherein said layers of fiber blends are expressed by the formulae:

$$\frac{1}{M} = \varepsilon_i \varepsilon \Lambda \varepsilon_n \left( \sum_{i=1}^{n} \frac{1}{M_i} \right)$$

and $$\frac{1}{v} = \varepsilon_i \varepsilon \Lambda \varepsilon_n \left( \sum_{i=1}^{n} \frac{1}{v_i} \right)$$

with the porosity "$\epsilon$" being the ratio of the pore volume to the total volume of medium, "$\Sigma$" is the summation from "i"=1 to n, "M" is the mean flow pore diameter of the filter media thicknesses and "v" is fluid velocity in cubic feet per minute over square feet (cfm/sq. ft.).

9. A gas filter media of claim 1 having a minimum Gurley stiffness of 500 mg. and a permeability in a range of 100 to 700 cubic feet per minute over square feet (cfm/sq. ft.)

10. A gas filter media of claim 1 wherein a portion of said first fiber blend is electret.

11. A gas filter media of claim 1 having a self supporting structure.

12. The gas filter media of claim 1 having a third layer composed of a third fiber blend having a third average fiber size and an amount of third single component fibers, said third average fiber size being less than said second average fiber size, said third fiber blend having a portion less than or equal to a smallest single component fiber size of said amount of second single component fibers.

13. The gas filter media of claim 12 wherein said third fiber blend has bicomponent fibers in a range of 20% to 100% with the remainder being said amount of third single component fibers.

14. The gas filter media of claim 12 wherein said third fiber blend has 4 denier or less than 4 denier single component fibers.

15. The gas filter media of claim 12 wherein said second layer and third layer have an odor neutralizer or an adsorbent material therebetween providing for removal of odor or volatile organic compounds.

16. The gas filter media of claim 12 having a fourth layer composed of a fourth fiber blend having a fourth average fiber size and an amount of fourth single component fibers, said fourth average fiber size being less than said third average fiber size, said fourth fiber blend having a portion less than or equal to a smallest single component fiber size of said amount of third single component fibers.

17. A gradient density air filter media comprising:
   a first layer of chopped fibers having a first average fiber size and a first quantity of single component fibers;
   a second layer of chopped fibers having a second average fiber size and a second quantity of single component fibers;
   said first average fiber size being greater than said second average fiber size;
   said first layer of chopped fibers having at least some fibers with a fiber size greater than or equal to a greatest fiber size of said second quantity of single component fibers;

said second layer of chopped fibers having at least some fibers with a fiber size less than or equal to a smallest fiber size of said first quantity of single component fibers; and said first and second layers of chopped fibers each being individually carded and being overlaid with one another in intertangled relationship to create said gradient density;

said media having improved efficiency of particulate removal and extended life.

18. A self supporting multi layer gas filter media having at least dual layer gradient density comprising:
a first layer composed of a first fiber blend having a first average fiber size and an amount of first single component fibers;
a second layer composed of a second fiber blend having a second average fiber size and an amount of second single component fibers;
said first average fiber size being greater than said second average fiber size;
said first fiber blend having a portion larger than or equal to a largest single component fiber size of said amount of second single component fibers; and
said first and second layers being individually carded to create said gradient density and subsequently compressed to form multi layer partially melted or fuse bonded;
said media having improved efficiency of particulate removal.

19. The self supporting media of claims 18 wherein said first and second layers are partially melted or fuse bonded.

20. The gas filter media of claim 18 having a third layer composed of a third fiber blend having a third average fiber size and an amount of third single component fibers, said third average fiber size being less than said second average fiber size, said third fiber blend having a portion less than or equal to a smallest single component fiber size of said amount of second single component fibers.

* * * * *